US011977625B2

(12) United States Patent
Molloy et al.

(10) Patent No.: US 11,977,625 B2
(45) Date of Patent: May 7, 2024

(54) USING MULTIMODAL MODEL CONSISTENCY TO DETECT ADVERSARIAL ATTACKS

(71) Applicant: International Business Machines Corporation, Armonk, NY (US)

(72) Inventors: Ian Michael Molloy, Westchester, NY (US); Youngja Park, Princeton, NJ (US); Taesung Lee, Ridgefield, CT (US); Wenjie Wang, Decatur, GA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 18/196,712

(22) Filed: May 12, 2023

(65) Prior Publication Data

US 2023/0281298 A1 Sep. 7, 2023

Related U.S. Application Data

(63) Continuation of application No. 16/844,867, filed on Apr. 9, 2020, now Pat. No. 11,675,896.

(51) Int. Cl.
*G06F 21/52* (2013.01)
*G06F 21/64* (2013.01)
*G06N 20/00* (2019.01)

(52) U.S. Cl.
CPC ............. *G06F 21/52* (2013.01); *G06F 21/64* (2013.01); *G06N 20/00* (2019.01); *G06F 2221/033* (2013.01)

(58) Field of Classification Search
CPC .... G06F 21/52; G06F 21/64; G06F 2221/033; G06F 21/54; G06F 21/554; G06N 20/00;
(Continued)

(56) References Cited

U.S. PATENT DOCUMENTS

| 11,675,896 B2 | 6/2023 | Molloy |
| 2015/0355957 A1 | 12/2015 | Steiner et al. |
| 2018/0240473 A1* | 8/2018 | Baracaldo Angel .... G10L 15/26 |
| 2019/0135300 A1 | 5/2019 | Aguirre et al. |
| 2019/0244103 A1 | 8/2019 | Wang et al. |
| 2020/0012780 A1* | 1/2020 | Seshadri ............... H04W 12/61 |

(Continued)

FOREIGN PATENT DOCUMENTS

WO WO-2020028382 A1 * 2/2020 ........... A61B 6/5211

OTHER PUBLICATIONS

Baltrusaltis et al., "Multimodal Machine Learning: A Survey and Taxonomy," arXiv:1705.09406v2 [cs.LG] Aug. 1, 2017.

(Continued)

*Primary Examiner* — Michael R Vaughan
(74) *Attorney, Agent, or Firm* — Edward J. Wixted, III

(57) ABSTRACT

A method, apparatus and computer program product to defend learning models that are vulnerable to adversarial example attack. It is assumed that data (a "dataset") is available in multiple modalities (e.g., text and images, audio and images in video, etc.). The defense approach herein is premised on the recognition that the correlations between the different modalities for the same entity can be exploited to defend against such attacks, as it is not realistic for an adversary to attack multiple modalities. To this end, according to this technique, adversarial samples are identified and rejected if the features from one (the attacked) modality are determined to be sufficiently far away from those of another un-attacked modality for the same entity. In other words, the approach herein leverages the consistency between multiple modalities in the data to defend against adversarial attacks on one modality.

21 Claims, 6 Drawing Sheets

(58) Field of Classification Search
CPC .. G06N 3/0481; G06N 3/0445; G06N 3/0454; G06N 3/084
See application file for complete search history.

(56) References Cited

U.S. PATENT DOCUMENTS

| | | | | |
|---|---|---|---|---|
| 2020/0327443 | A1 | 10/2020 | Van Vredendaal et al. | |
| 2020/0349414 | A1* | 11/2020 | Bazhenov | G06F 18/256 |
| 2020/0364624 | A1* | 11/2020 | Kearney | G06F 18/256 |
| 2020/0372369 | A1* | 11/2020 | Gong | G06N 3/088 |
| 2021/0073376 | A1* | 3/2021 | Tran | G06N 3/045 |
| 2021/0110045 | A1* | 4/2021 | Buesser | G06N 3/088 |
| 2021/0216859 | A1* | 7/2021 | Liu | G06N 3/045 |
| 2021/0224425 | A1* | 7/2021 | Nasr-Azadani | G06N 20/20 |
| 2021/0224486 | A1* | 7/2021 | Stabler | G06F 18/2148 |
| 2021/0248241 | A1* | 8/2021 | Balkanski | G06F 18/2433 |

OTHER PUBLICATIONS

Huang, et al., "ClinicalBert: Modeling Clinical Notes and Predicting Hospital Readmission," arXiv:1904.05342v2 [cs.CL] Apr. 11, 2019.

Wang, et al., "EANN: Event Adversarial Neural Networks for Multi-Modal Fake News Detection," KDD '18, Aug. 19-23, 2018, London, United Kingdom.

Zhang, et al., "Adversarial Attacks on Deep Learning Models in Natural Language Processing: A Survey," arXiv:1901.06796v3 [cs.CL] Apr. 11, 2019.

Mogadala, et al., "Trends in Integration of Vision and Language Research: A Survey of Tasks, Datasets, and Methods," arXiv:1907.09358v1 [cs.CV] Jul. 22, 2019.

Alsentzer, et al., "Publicly Available Clinical BERT Embeddings", https://doi.org/10.48550/arXiv.1904.03323, Computer Science, Computation and Language, last revised Jun. 20, 2019, v3, accessed Jan. 2, 2024, p. 8.

Gao, et al., "Black-box Generation of Adversarial Text Sequences to Evade Deep Learning Classifiers", DOI 10.1109/ SPW.2018.00016, 2018 IEEE Symposium on Security and Privacy Workshops, Accessed Jan. 2, 2024, pp. 50-56.

IBM: List of IBM Patents or Patent Applications Treated as Related. Filed Herewith, 2 Pages.

P201908688US02, May 12, 2023, U.S. Appl. No. 18/196,712, U.S. Pat. Pub. No. 2023/0281298.

P201908688US01 Apr. 9, 2020, U.S. Appl. No. 16/844,867, U.S. Pat. Pub. No. 2021/031,9093, U.S. Pat. No. 11,675,896.

* cited by examiner

USING MULTIMODAL MODEL CONSISTENCY TO DETECT ADVERSARIAL ATTACKS

BACKGROUND

Technical Field

This disclosure relates generally to information security and, in particular, to protecting machine learning models.

Background of the Related Art

Machine learning technologies, which are key components of state-of-the-art Artificial Intelligence (AI) services, have shown great success in providing human-level capabilities for a variety of tasks, such as image recognition, speech recognition, and natural language processing, and others. Most major technology companies are building their AI products and services with deep learning models (e.g., deep neural networks (DNNs)) as the key components. Building a production-level deep learning model is a non-trivial task, which requires a large amount of training data, powerful computing resources, and human expertise. For example, the creation of a Convolutional Neural Network (CNN) designed for image classification may take from several days to several weeks on multiple GPUs with an image dataset having millions of images. In addition, designing a deep learning model requires significant machine learning expertise and numerous trial-and-error iterations for defining model architectures and selecting model hyper-parameters.

Deep learning has been shown to be effective in a variety of real-world applications such as computer vision, natural language processing and speech recognition. It also has shown great potentials in clinical informatics such as medical diagnosis and regulatory decisions, including learning representations of patient records, supporting disease phenotyping and conducting predictions. Recent studies, however, show that these models are vulnerable to adversarial attacks, which attacks are design to intentionally inject small perturbations (also known as "adversarial examples") to a model's data input to cause misclassifications. In image classification, researchers have demonstrated that imperceptible changes in input can mislead the classifier. In text domain, synonym substitution or character/word level modification on a few words can also cause the model to misclassify. These perturbations are mostly imperceptible to humans but can easily fool a high-performance deep learning model.

These findings have spurred many new studies in the machine learning (ML) community on developing countermeasures. In the image domain, defense methods generally fall into several categories based on their strategies: (1) image de-noising and reformer through an auto-encoder; (2) distinguishing adversarial and benign samples based on certain criteria ("detector"); (3) integrating adversarial samples in model training ("adversarial training"); and (4) gradient masking, such as pushing a model gradient to a non-differential or zero, which is effective for gradient-based white-box attacks. All of the above methods, however, have drawbacks, either being specific to certain kind of attacks or being defeated by further designed attacks. For example, in text domain, spelling or syntax check can easily detect adversarial samples generated by introducing misspelled words or replacing certain words with their synonyms. For synonym substitution-based attacks, one solution proposes to insert an encoder before the input layers to eliminate adversarial perturbations. This method is effective, but it sacrifices the model performance on clean data.

Most existing defense mechanisms have focused on a single modality of the data and have been largely unsuccessful. In the real world, data often comes in multiple modalities (e.g., images with tags and text captions), which presents both challenges and opportunities for building more robust defense systems. This is because some modalities are particularly susceptible to adversarial attacks and lack effective defense mechanisms.

Thus, there remains a need in the art to provide techniques to address adversarial attack that target deep learning models.

BRIEF SUMMARY

The technique herein provides for a new method to defend learning models that are vulnerable to adversarial example attack. It is assumed that data (a "dataset") is available in multiple modalities (e.g., text and images, audio and images in video, etc.). The defense approach herein is premised on the recognition that the correlations between the different modalities for the same entity can be exploited to defend against such attacks, as it is not realistic for an adversary to attack multiple modalities. To this end, according to this technique, adversarial samples are identified and rejected if the features from one (the attacked) modality are determined to be sufficiently far away from those of another un-attacked modality for the same entity. In other words, the approach herein leverages the consistency between multiple modalities in the data to defend against adversarial attacks on one modality.

In one embodiment, a dataset of interest comprises at least first and second modalities (e.g., text and numerical sequence modalities). The nature of the dataset and the available modalities is not a limitation of the approach. A model for each modality is then separately pre-trained, preferably with clean data (samples). Feature extraction on each model is then performed, preferably by using outputs of the respective model's last fully-connected layer before a logits layer as the extracted features. Because the extracted features (a feature set) from the first and second modalities are in different features spaces, the extracted feature sets are then processed through a projection operation to bring the two feature sets into a same feature space. The projection operation utilizes a projection model, which is a fully-connected layer network trained in advance on the clean samples for each modality. Following projection, a consistency check model is trained on clean data, preferably by minimizing a consistency level between multimodal features. In one embodiment, the consistency level is defined as a given function (e.g., an $L_2$ norm) of the projected features from the two modalities. This determines a threshold for a consistency check. After the training phase is complete, the system is then configured or provisioned to use multimodal consistency checking to detect adversarial examples for new inputs. To this end, and in a testing phase, the system rejects an input sample if the consistency level between two modalities is greater than the defined threshold, where the threshold is decided based on what percentage of clean samples are allowed to pass through the given function. If samples do not pass the consistency check, they are automatically detected and determined to be adversarial samples, and appropriate countermeasures (including, without limitation, rejection of the input sample) are then undertaken to address the attack.

The foregoing has outlined some of the more pertinent features of the subject matter. These features should be construed to be merely illustrative. Many other beneficial results can be attained by applying the disclosed subject matter in a different manner or by modifying the subject matter as will be described.

BRIEF DESCRIPTION OF THE DRAWINGS

For a more complete understanding of the subject matter and the advantages thereof, reference is now made to the following descriptions taken in conjunction with the accompanying drawings, in which.

DETAILED DESCRIPTION OF AN ILLUSTRATIVE EMBODIMENT

Figure 1:
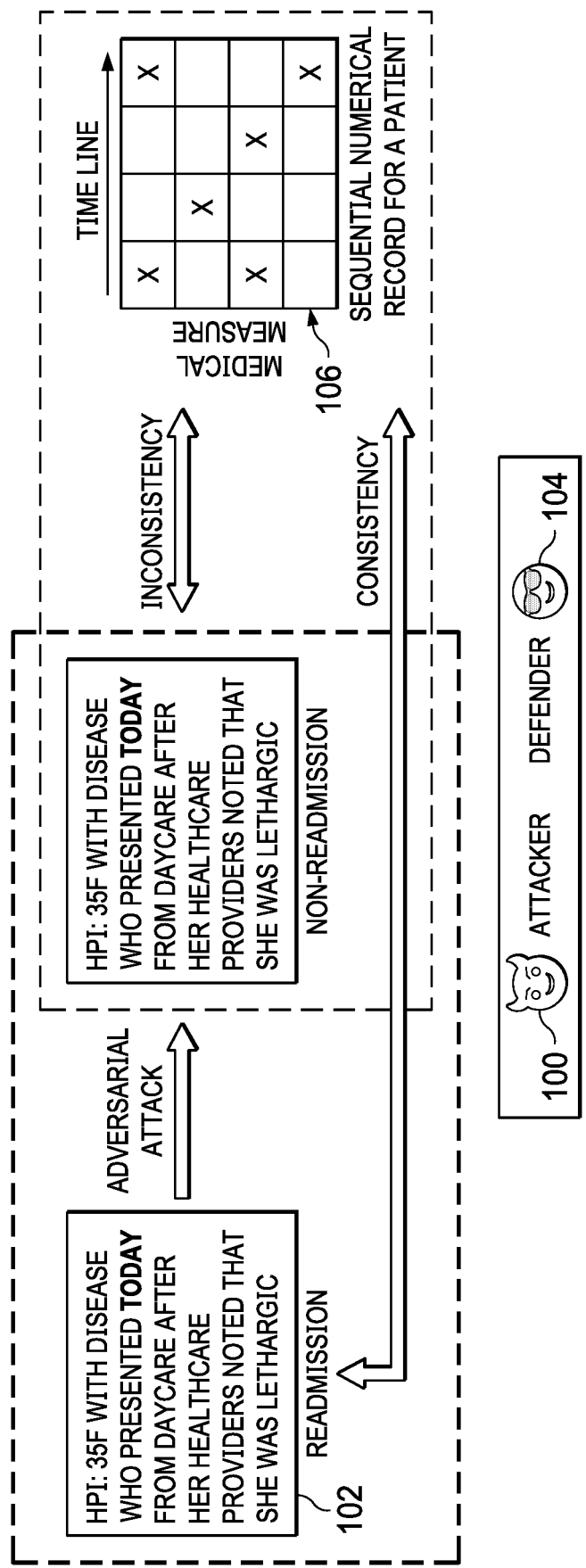
FIG. 1 depicts an example adversarial attack scenario in a machine learning model-based readmission prediction task.

For exemplary purposes, the technique herein is described in a representative case study involving a medical machine learning (ML) system. These types of systems have been shown to be uniquely susceptible to adversarial attacks, in part due to high financial interests such as insurance claims. This example scenario is provided solely for descriptive purposes, and it is not intended to be limiting, as the multimodal model consistency checking technique herein is useful for any dataset having multiple modalities. In the example scenario, the machine learning is carried out on a hospital readmission prediction task using an electronic health record (EHR) dataset. More specifically, the task is used to predict a 30-day readmission risk. In this example, the EHR dataset consists of multiple modalities including sequential numerical data, clinical summary notes (text) and medical images (e.g., x-rays/MRIs, etc.) Among these different modalities, it is assumed that one of them, e.g., the clinical summary (text) has a risk of being attacked, e.g., because it is created using a third party dictation system. Another modality, e.g., the sequential numerical data, is less prone to attack, at least relative to the clinical summaries. In the approach herein, and as depicted in FIG. 1, adversarial examples on the clinical summary text modality (the attacked modality) are checked against the sequential numerical data (the un-attacked modality) to detect adversarial samples. As noted generally above, to this end, a multimodal feature consistency check is carried out to automatically validate the consistency between these multiple modalities in the data.

As seen in FIG. 1, an attacker 100 using an adversarial attack has caused the word "today" in the clinical summary 102 in the EHR to be changed to the word "tonight." This change causes a misclassification of the readmission decision being made by the underlying machine learning model. To detect and defend against this attack, the defender 104 (practicing the technique herein) performs multimodal feature consistency checking, in this example against a model derived from sequential numerical records (such as record 106) for the patient identified in the clinical summary 102. As will be described, the detection finds the inconsistency between the attacked (text) and un-attacked (numerical) modalities to enable defensive countermeasures or other remedial action (in this case, an appropriate readmission prediction) to be taken. The nature of the countermeasures or other actions will vary depending on the implementation. In this example, the suspect input record is discarded.

Figure 2:
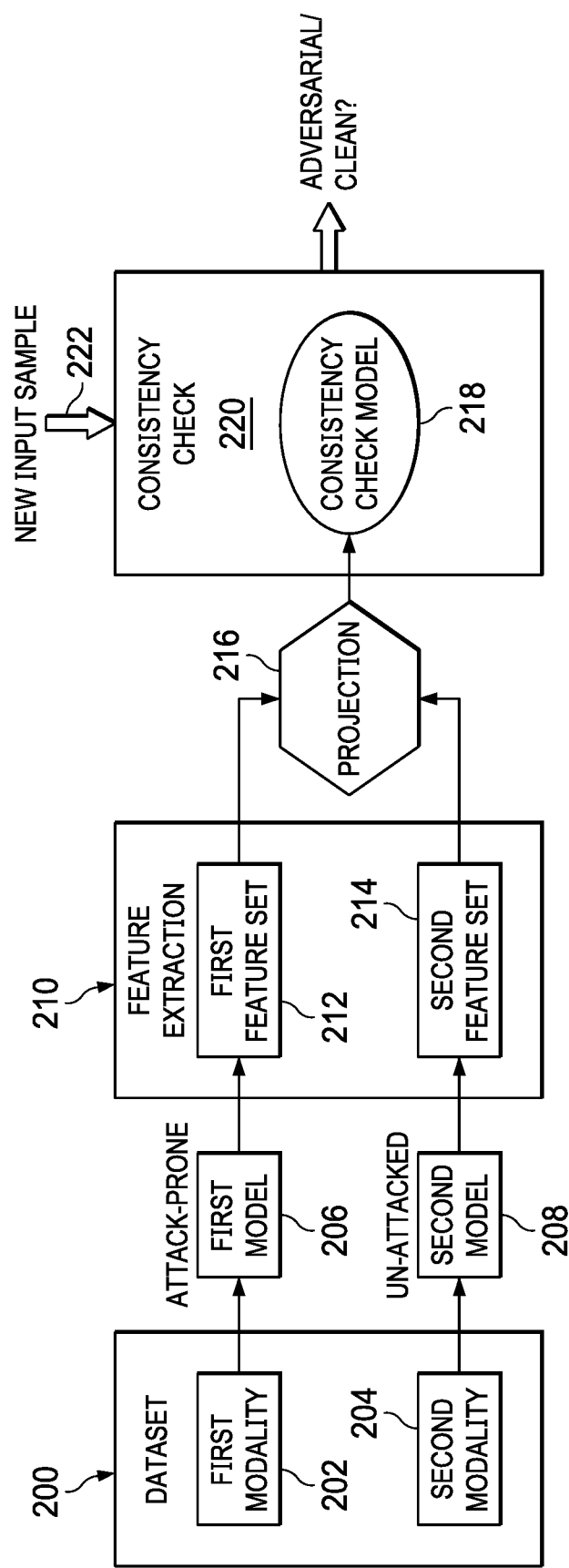
FIG. 2 depicts a multimodal model consistency checking framework of this disclosure.

FIG. 2 depicts the basic detection framework of the approach of this disclosure. In the framework, a dataset 200 comprises at least first data 202 and second data 204. The first data 202 is a first modality, and the second data is a second modality distinct from the first modality; the multiple modalities 202 and 204, however, have duplicate information, albeit in different forms, and one of the modalities has a higher risk of being attacked. As used herein, a modality that has the higher risk of adversarial attack is sometimes referred to as the attacked modality, whereas the modality that has the relatively lower risk of attack (or that cannot be attacked readily) is sometimes referred to as the un-attacked modality. The nature and degree of vulnerability (to attack) need not be absolutes, but may be relative values. The notion here is that it is presumed to be difficult for an attacker to make coherent perturbations across both modalities. Stated another way, the technique herein leverages consistency between the attacked and un-attacked modalities in the data to defend against adversarial attacks on the attacked modality. The approach as depicted is simplified to show just one un-attacked modality, but this is not a limitation, as the approach can be generalized irrespective of the number of modalities.

As shown in FIG. 2, a model for each modality is then separately pre-trained, preferably with clean data (samples). Thus, the first data 202 is used to train a first model 206, and the second data 204 is used to train a second model 208. As depicted, the first model 206 is assumed here to be attack-prone, as compared to the second model 208, which is assumed to be un-attacked. Feature extraction 210 is then performed on each of the models. To that end, the feature extraction on each model is then performed to generate respective first and second feature sets 212 and 214. Preferably, a feature set (the extracted features) is derived by using outputs of the respective model's last fully-connected layer before a logits layer (not shown). Typically, the extracted features (the feature set) from the first and second models 206 and 208 (the distinct modalities) are in different features spaces. Thus, one or both of the extracted feature sets are then processed through a projection operation 216 to bring the two feature sets into the same feature space. Preferably, the projection operation utilizes a projection model, which is a fully-connected layer network trained in advance on the clean samples for each modality. Following projection, a consistency check model 218 is trained on clean data, preferably by minimizing a consistency level between multimodal features. In one embodiment, the consistency level is defined as a given function (e.g., an $L_2$ norm) of the projected features from the two modalities. This determines a threshold for a consistency check. This completes a training phase.

After the training phase is complete, the system is then configured or provisioned to use multimodal consistency checking 220 to detect adversarial examples for new inputs 222. To this end, and in a testing phase, the system rejects an input sample if the consistency level between two modalities is greater than the defined threshold, where the threshold is decided based on what percentage of clean samples are allowed to pass through the given function. If samples do not pass the consistency check, they are automatically detected and determined to be adversarial samples, and appropriate countermeasures are then undertaken to address the attack.

Figure 3:
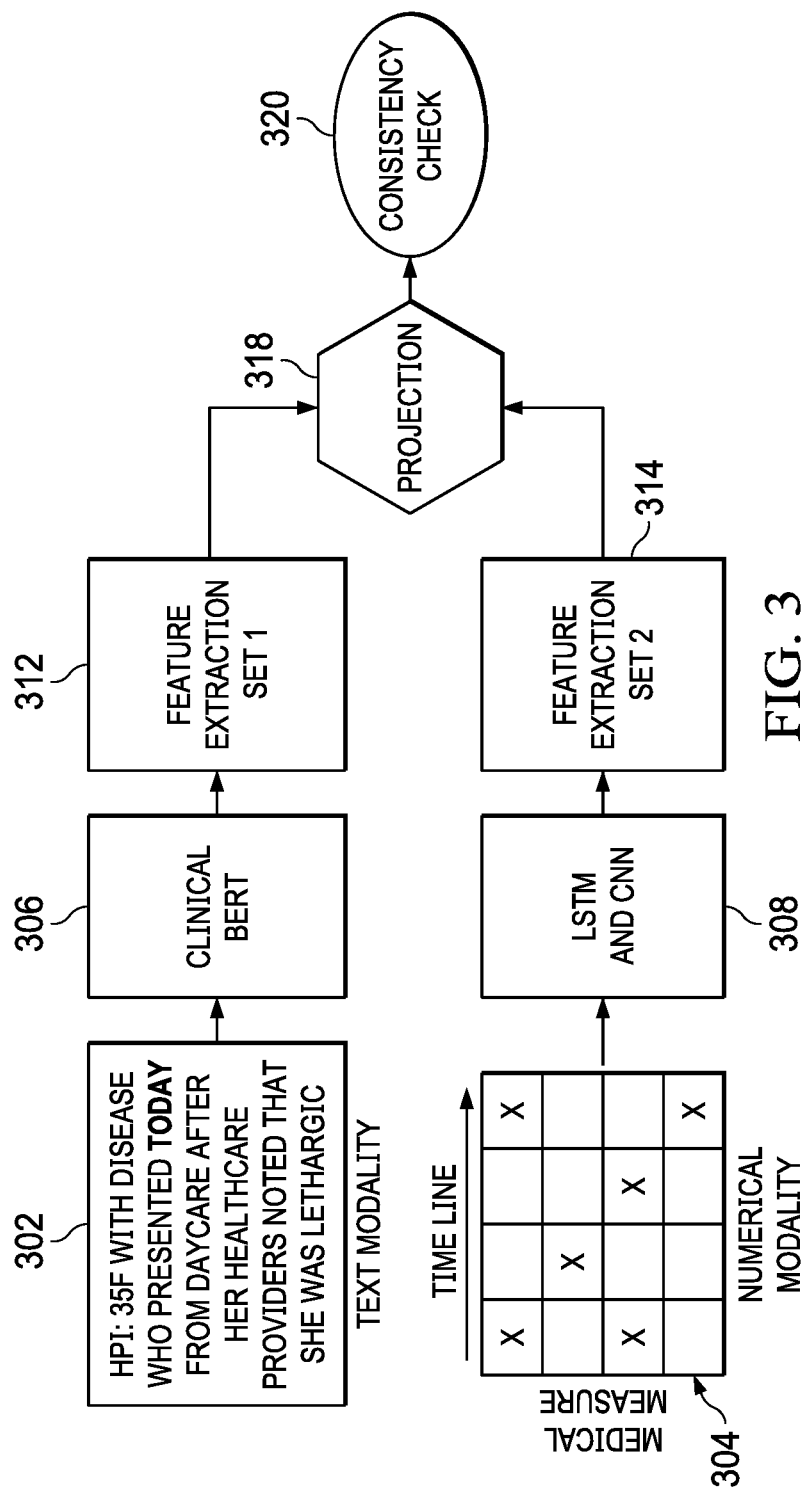
FIG. 3 depicts a detection pipeline for an example case study involving clinical text and numerical modalities associated with a readmission prediction derived from an EHR dataset in FIG. 1.

FIG. 3 depicts the above-described framework continuing with the case study example of the machine learning-based readmission task. As noted above, while text and numerical modalities are used, the framework is not limited to any particular modality. Once again, the only constraint is that multiple modalities have duplicate information (albeit in different forms) and the modality against which the consistency check is carried out (with respect to a modality under attack) is an un-attacked modality.

Figure 4:
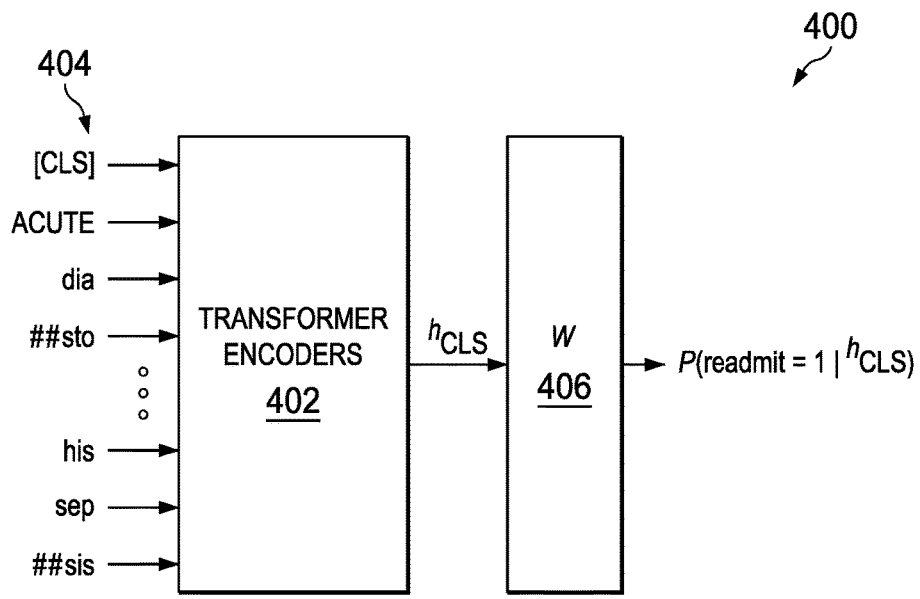
FIG. 4 depicts a representative modeling flow for the text modality ClinicalBert model shown in FIG. 3.

As shown, the dataset is derived from an EHR database. The first data 302 is the text modality, with one of the data records shown. In this example, a publicly-available clinical dataset comprising EHR information related to patients admitted to critical care units is the MIMIC-III (the Multi-parameter Intelligent Monitoring in Intensive Care) database. The first model 306 is ClinicalBert, which evaluates and represents clinical notes by applying the BERT (Bidirectional Encoder Representations from Transformers) language model. ClinicalBert is a modified BERT model, in which representations are learned using medical notes and further processed for downstream clinical tasks. In this example scenario, a pre-trained ClinicalBert is used as a feature extractor. It is pre-trained with certain tasks and fine-tuned on readmission predictions. ClinicalBert also provides a readmission classifier, which is a single layer fully-connected layer; this classification representation is used as the extracted feature in this example scenario. FIG. 4 depicts the ClinicalBert architecture 400, which comprises a set of transformer encoders 402 that learn a classification representation $h_{CLS}$. The model is fed a patient's clinical notes 404, and the patient's risk of readmission (e.g., within a 30-day window) is predicated using a linear layer 406 applied to the classification representation. As noted above, ClinicalBert is based on BERT, which is a deep neural network that uses the transformer encoder architecture to learn embeddings for text. An architecture of this type is based on a self-attention mechanism, and a pre-training objective function for the model is defined using two unsupervised tasks: masked language modeling and next sentence prediction. In ClinicalBert, a clinical note is represented as a set of tokens, which are subword units extracted from text.

Figure 5:
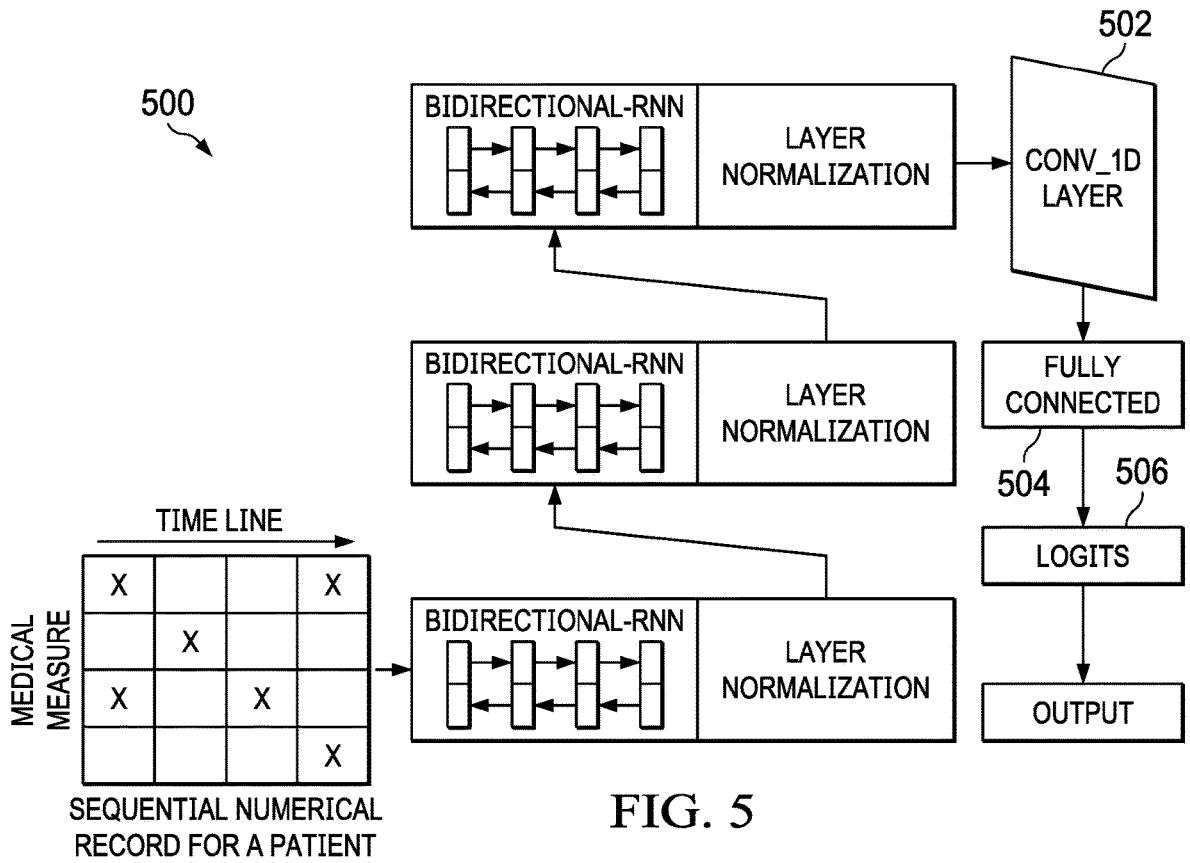
FIG. 5 depicts a representative modeling flow for the sequential numerical modality (LSTM+CNN) model shown in the FIG. 3.

Referring now back to FIG. 3, for the numerical records, namely, the second data 304 (with one example record depicted), a heterogeneous bidirectional LSTM (Long Short Term Memory)+CNN model 308 is used in this example scenario. This model automates the feature extraction process for this modality, and in particular by considering both time series correlation and feature correlation. With reference to FIG. 5, a representative architecture for this modality model is a stacked bidirectional-LSTM 500, followed by a convolutional layer 502 and a fully-connected layer 504 (the last before the logits 506), the latter being used as extracted features in one embodiment. It is not required that the last fully-connected layer be used, as the extracted features may in an alternative embodiment be derived from middle layers or using other feature extraction methods.

Referring once again back to FIG. 3, and as has been described, the feature sets 312 and 314 for the respective models are then extracted, the projection step 318 is applied to bring the models into a same feature space, and the consistency checking 320 is then carried out. In particular, if an input sample does not pass the consistency, it is characterized (i.e. automatically detected/rejected) as adversarial.

The objective function of the projection model generated by the projection operation is specified by the following cost function equation:

$$\min_{(\theta_1, \theta_2)} MSE(p\_\theta_1(F_1(m_1)) - p\_\theta_2(F_2(m_2))),$$

where MSE refers to mean squared error, $m_1$ and $m_2$ represent different modalities, and $F_i$ and $p\_\theta_i$ model are the feature extractor and the projector of $m_i$, respectively. The relation above is an example of a MSE cost function. The MSE measures the average amount that a model's predictions vary from correct values, and the cost is higher when the model is performing poorly on the training set. An objective is to find the parameters $\theta_1$ and $\theta_2$ that minimize the cost $\min_{(\theta_1, \theta_2)} MSE$. With the above in hand, a consistency model is trained only on clean data by minimizing the consistency level between multimodal features. The consistency level is defined as the $L_2$ norm of the projected features from the two modalities. The system rejects an input sample if the consistency level between two modalities is greater than a threshold $\delta$:

$$\|p_1(F_1(m_1)) - p_2(F_2(m_2))\|_2 > \delta,$$

where $\delta$ is decided based on what percentage of clean samples are allowed to pass the detector. Stated another way, the threshold is the consistency level $\delta$, which is decided by allowing certain percentages of clean samples to pass the detection.

The following provides additional details of the above-described modeling approach for the readmission classification task using the MIMIC-III data. It is assumed that the attacker targets the clinical summary modality. A dataset containing 34,560 patients with 2,963 positive readmission labels and 48,150 negative labels is used. In MIMIC-III, there are several categories in the clinical notes including ECG summaries, physician notes, and discharge summaries. In a specific example scenario, the discharge summary is selected as the text modality, as it is the most relevant to a readmission prediction. As noted the pre-trained ClinicalBert is used for the model for this modality. For the numerical data modality that is used to conduct the consistency check, the patient's health data in their medical records are utilized. In this example, a patient identifier from the discharge summary is used to extract the multivariate time series numerical records consisting (in this example) of 90 continuous features including vital signs such as heart rate and blood pressure, as well as other lab measurements. Preferably, the features are selected based on the frequency of their appearance in all the patients' records. A standardization is applied for each feature across all patients and time step, and all of the sequences are padded to the same length, e.g., 120 hours before discharge, as this time slot is found to be important to predict the readmission rate. Previous time steps are ignored if the patient stayed more than 120 hours, and the last time step is repeated if a patient's sequence is shorter than 120 hours. Then the numerical data is represented as a 3-dimensional tensor: (patients)×(time step (120))×(features (90)).

The models of the respective modalities should have comparable performance with each other so the extracted features from the two modalities have a similar representative ability.

The technique described above has significant advantages. In particular, the approach leverages the notion that it is difficult for an attacker to make coherent perturbations across all modalities. For example, using the gradient to find the steepest change in the decision surface is a common attack strategy, but such a gradient can be drastically different from modality-to-modality. Moreover, for a certain modality, even if the adversarial and clean samples are close in the input space, their differences are amplified in the feature space. The technique herein takes advantage of this by introducing another un-attacked modality into the analysis of input data directed to a target (attacked) modality. Then, and according to the approach herein, the difference between the two modalities becomes a robust criterion to distinguish adversarial and clean samples.

One or more aspects of this disclosure (e.g., the initial training, the testing for adversarial samples, etc.) may be implemented as-a-service, e.g., by a third party. The subject matter may be implemented within or in association with a data center that provides cloud-based computing, data storage or related services.

In a typical use case, a SIEM or other security system has associated therewith an interface that can be used to issue API queries to the trained consistency check model, and to receive responses to those queries including responses indicator of adversarial input.

The approach herein is designed to be implemented on-demand, or in an automated manner.

Access to the service for model training or use to identify adversarial input may be carried out via any suitable request-response protocol or workflow, with or without an API.

Enabling Technologies

The above-described adversarial attack defense method may be implemented in association with enabling technologies, which are now described.

Deep Learning

By way of additional background, deep learning is a type of machine learning framework that automatically learns hierarchical data representation from training data without the need to handcraft feature representation. Deep learning methods are based on learning architectures called deep neural networks (DNNs), which are composed of many basic neural network units such as linear perceptrons, convolutions and non-linear activation functions. Theses network units are organized as layers (from a few to more than a thousand), and they are trained directly from the raw data to recognize complicated concepts. Lower network layers often correspond with low-level features (e.g., in image recognition, such as corners and edges of images), while the higher layers typically correspond with high-level, semantically-meaningful features.

Specifically, a deep neural network (DNN) takes as input the raw training data representation and maps it to an output via a parametric function. The parametric function is defined by both the network architecture and the collective parameters of all the neural network units used in the network architecture. Each network unit receives an input vector from its connected neurons and outputs a value that will be passed to the following layers. For example, a linear unit outputs the dot product between its weight parameters and the output values of its connected neurons from the previous layers. To increase the capacity of DNNs in modeling the complex structure in training data, different types of network units have been developed and used in combination of linear activations, such as non-linear activation units (hyperbolic tangent, sigmoid, Rectified Linear Unit, etc.), max pooling and batch normalization. If the purpose of the neural network is to classify data into a finite set of classes, the activation function in the output layer typically is a softmax function, which can be viewed as the predicted class distribution of a set of classes.

Prior to training the network weights for a DNN, an initial step is to determine the architecture for the model, and this often requires non-trivial domain expertise and engineering efforts. Given the network architecture, the network behavior is determined by values of the network parameters. More formally, let $D=\{x_i, z_i\}_{i=1}^{T}$ be the training data, where $z_i \cdot [0, n-1]$ is a ground truth label for $x_i$, the network parameters are optimized to minimize a difference between the predicted class labels and the ground truth labels based on a loss function. Currently, the most widely-used approach for training DNNs is a back-propagation algorithm, where the network parameters are updated by propagating a gradient of prediction loss from the output layer through the entire network. Most commonly-used DNNs are feed-forward neural networks, wherein connections between the neurons do not form loops; other types of DNNs include recurrent neural networks, such as long short-term memory (LSTM), and these types of networks are effective in modeling sequential data.

Formally, a DNN has been described in literature by a function g: X→Y, where X is an input space, and Y is an output space representing a categorical set. For a sample x that is an element of X, $g(x)=f_L(F_{L-1}(\ldots((f_1(x))))$. Each $f_i$ represents a layer, and $F_L$ is the last output layer. The last output layer creates a mapping from a hidden space to the output space (class labels) through a softmax function that outputs a vector of real numbers in the range [0, 1] that add up to 1. The output of the softmax function is a probability distribution of input x over C different possible output classes.

Figure 6:
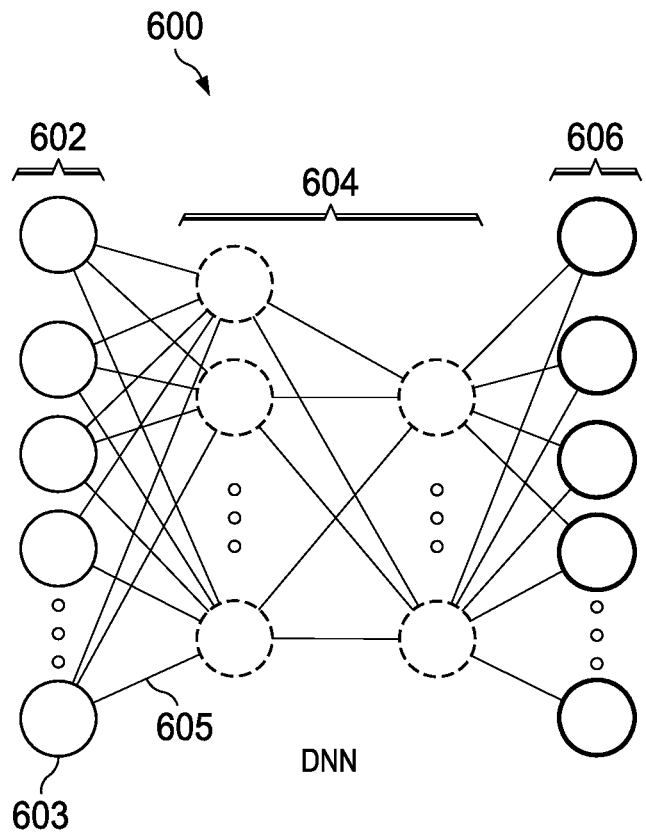
FIG. 6 depicts a representative deep learning model (DNN)

FIG. 6 depicts a representative DNN 600, sometimes referred to an artificial neural network. As depicted, DNN 600 is an interconnected group of nodes (neurons), with each node 603 representing an artificial neuron, and a line 605 representing a connection from the output of one artificial neuron to the input of another. In the DNN, the output of each neuron is computed by some non-linear function of the sum of its inputs. The connections between neurons are known as edges. Neurons and the edges typically have a weight that adjusts as learning proceeds. The weight increases or decreases the strength of the signal at a connection. As depicted, in a DNN 600 typically the neurons are aggregated in layers, and different layers may perform different transformations on their inputs. As depicted, signals (typically real numbers) travel from the first layer (the input layer) 602 to the last layer (the output layer) 604, via traversing one or more intermediate (the hidden layers) 606. Hidden layers 606 provide the ability to extract features from the input layer 602. As depicted in FIG. 6, there are two hidden layers, but this is not a limitation. Typically, the number of hidden layers (and the number of neurons in each layer) is a function of the problem that is being addressed by the network. A network that includes too many neurons in a hidden layer may overfit and thus memorize input patterns, thereby limiting the network's ability to generalize. On the other hand, if there are too few neurons in the hidden layer(s), the network is unable to represent the input-space features, which also limits the ability of the network to generalize. In general, the smaller the network (fewer neurons and weights), the better the network.

The DNN 600 is trained using a training data set, thereby resulting in generation of a set of weights corresponding to the trained DNN. Formally, a training set contains N labeled inputs where the $i^{th}$ input is denoted $(x_i, y_i)$. During training, parameters related to each layer are randomly initialized, and input samples $(x_i, y_i)$ are fed through the network. The output of the network is a prediction $g(x_i)$ associated with the $i^{th}$ sample. To train the DNN, the difference between a predicted output $g(x_i)$ and its true label, $y_i$, is modeled with a loss function, $J(g(x_i), y_i)$, which is back-propagated into the network to update the model parameters.

Figure 7:
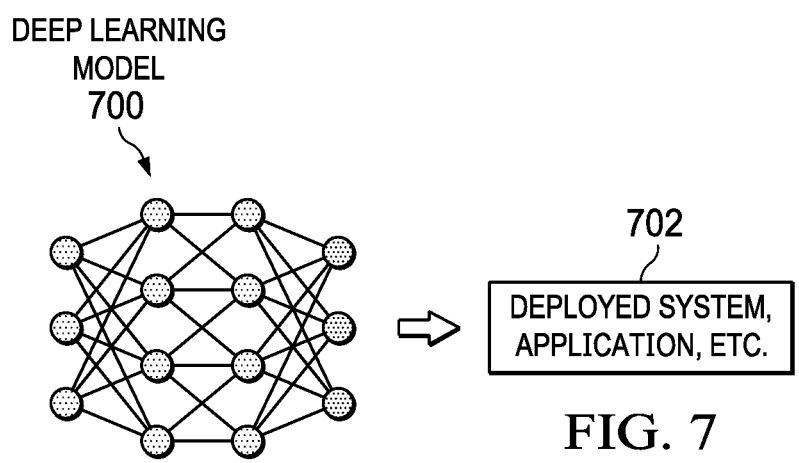
FIG. 7 depicts a deep learning model used in association with a deployed system or application.

FIG. 7 depicts a DNN 700 deployed as a front-end to a deployed system, application, task or the like 702. In one example scenario, the deployed system is a medical readmission classification task, as previously described. This is not a limitation, as the deployed system may be of any type in which machine learning is used to support decision-making.

Computing Technologies

Figure 8:
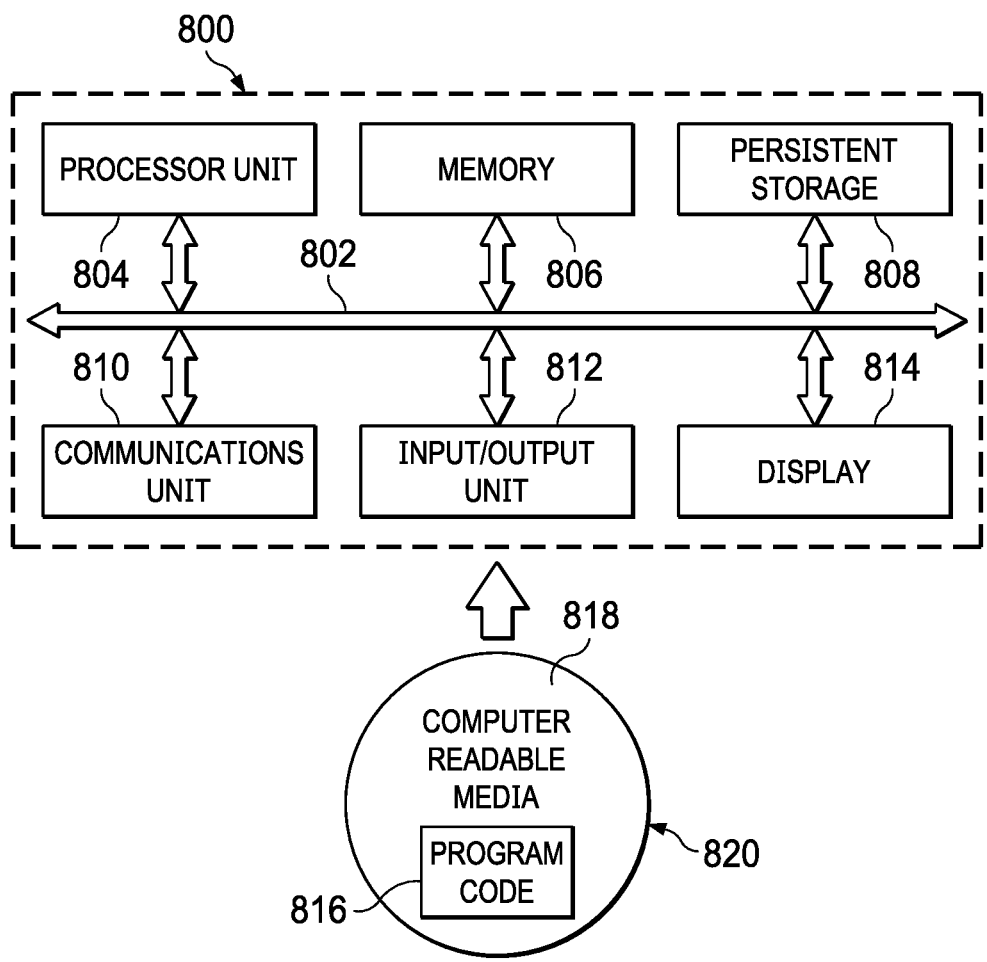
FIG. 8 is a block diagram of a data processing system in which exemplary aspects of the illustrative embodiments may be implemented.

FIG. 8 depicts an exemplary distributed data processing system in which the deployed system or any other computing task associated with the techniques herein may be implemented. Data processing system 800 is an example of a computer in which computer-usable program code or instructions implementing the processes may be located for the illustrative embodiments. In this illustrative example, data processing system 800 includes communications fabric 802, which provides communications between processor unit 804, memory 806, persistent storage 808, communications unit 810, input/output (I/O) unit 812, and display 814.

Processor unit 804 serves to execute instructions for software that may be loaded into memory 806. Processor unit 804 may be a set of one or more processors or may be a multi-processor core, depending on the particular implementation. Further, processor unit 804 may be implemented using one or more heterogeneous processor systems in which a main processor is present with secondary processors on a single chip. As another illustrative example, processor unit 804 may be a symmetric multi-processor (SMP) system containing multiple processors of the same type.

Memory 806 and persistent storage 808 are examples of storage devices. A storage device is any piece of hardware that is capable of storing information either on a temporary basis and/or a permanent basis. Memory 806, in these examples, may be, for example, a random access memory or any other suitable volatile or non-volatile storage device. Persistent storage 808 may take various forms depending on the particular implementation. For example, persistent storage 808 may contain one or more components or devices. For example, persistent storage 808 may be a hard drive, a flash memory, a rewritable optical disk, a rewritable magnetic tape, or some combination of the above. The media used by persistent storage 808 also may be removable. For example, a removable hard drive may be used for persistent storage 808.

Communications unit 810, in these examples, provides for communications with other data processing systems or devices. In these examples, communications unit 810 is a network interface card. Communications unit 810 may provide communications through the use of either or both physical and wireless communications links.

Input/output unit 812 allows for input and output of data with other devices that may be connected to data processing system 800. For example, input/output unit 812 may provide a connection for user input through a keyboard and mouse. Further, input/output unit 812 may send output to a printer. Display 814 provides a mechanism to display information to a user.

Instructions for the operating system and applications or programs are located on persistent storage 808. These instructions may be loaded into memory 806 for execution by processor unit 804. The processes of the different embodiments may be performed by processor unit 804 using computer implemented instructions, which may be located in a memory, such as memory 806. These instructions are referred to as program code, computer-usable program code, or computer-readable program code that may be read and executed by a processor in processor unit 804. The program code in the different embodiments may be embodied on different physical or tangible computer-readable media, such as memory 806 or persistent storage 808.

Program code 816 is located in a functional form on computer-readable media 818 that is selectively removable and may be loaded onto or transferred to data processing system 800 for execution by processor unit 804. Program code 816 and computer-readable media 818 form computer program product 820 in these examples. In one example, computer-readable media 818 may be in a tangible form, such as, for example, an optical or magnetic disc that is inserted or placed into a drive or other device that is part of persistent storage 808 for transfer onto a storage device, such as a hard drive that is part of persistent storage 808. In a tangible form, computer-readable media 818 also may take the form of a persistent storage, such as a hard drive, a thumb drive, or a flash memory that is connected to data processing system 800. The tangible form of computer-readable media 818 is also referred to as computer-recordable storage media. In some instances, computer-recordable media 818 may not be removable.

Alternatively, program code 816 may be transferred to data processing system 800 from computer-readable media 818 through a communications link to communications unit 810 and/or through a connection to input/output unit 812. The communications link and/or the connection may be physical or wireless in the illustrative examples. The computer-readable media also may take the form of non-tangible media, such as communications links or wireless transmissions containing the program code. The different components illustrated for data processing system 800 are not meant to provide architectural limitations to the manner in which different embodiments may be implemented. The different illustrative embodiments may be implemented in a data processing system including components in addition to or in place of those illustrated for data processing system 800. Other components shown in FIG. 8 can be varied from the illustrative examples shown. As one example, a storage device in data processing system 800 is any hardware apparatus that may store data. Memory 806, persistent storage 808, and computer-readable media 818 are examples of storage devices in a tangible form.

In another example, a bus system may be used to implement communications fabric 802 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 806 or a cache such as found in an interface and memory controller hub that may be present in communications fabric 802.

The techniques herein may be used with a host machine (or set of machines, e.g., running a cluster) operating in a standalone manner, or in a networking environment such as a cloud computing environment. Cloud computing is an information technology (IT) delivery model by which shared resources, software and information are provided over the Internet to computers and other devices on-demand. With this approach, an application instance is hosted and made available from Internet-based resources that are accessible through a conventional Web browser or mobile application over HTTP. Cloud compute resources are typically housed in large server farms that run one or more network applications, typically using a virtualized architecture wherein applications run inside virtual servers, or so-called "virtual machines" (VMs), that are mapped onto physical servers in a data center facility. The virtual machines typically run on top of a hypervisor, which is a control program that allocates physical resources to the virtual machines.

Typical cloud computing service models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Typical deployment models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

Some clouds are based upon non-traditional IP networks. Thus, for example, a cloud may be based upon two-tier CLOS-based networks with special single layer IP routing using hashes of MAC addresses. The techniques described herein may be used in such non-traditional clouds.

The system, and in particular the modeling and consistency checking components, typically are each implemented as software, i.e., as a set of computer program instructions executed in one or more hardware processors. The components may also be integrated with one another in whole or in part. One or more of the components may execute in a dedicated location, or remote from one another. One or more of the components may have sub-components that execute together to provide the functionality. There is no requirement that particular functions be executed by a particular component as named above, as the functionality herein (or any aspect thereof) may be implemented in other or systems.

The approach may be implemented by any service provider that operates infrastructure. It may be available as a managed service, e.g., provided by a cloud service. A representative deep learning architecture of this type is IBM® Watson® Studio.

The components may implement the workflow synchronously or asynchronously, continuously and/or periodically.

The approach may be integrated with other enterprise- or network-based security methods and systems, such as in a SIEM, APT, graph-based cybersecurity analytics, or the like.

Computer program code for carrying out operations of the present invention may be written in any combination of one or more programming languages, including an object-oriented programming language such as Java™, Smalltalk, C++ or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Those of ordinary skill in the art will appreciate that the hardware in FIG. 8 may vary depending on the implementation. Other internal hardware or peripheral devices, such as flash memory, equivalent non-volatile memory, or optical disk drives and the like, may be used in addition to or in place of the hardware depicted. Also, the processes of the illustrative embodiments may be applied to a multiprocessor data processing system, other than the SMP system mentioned previously, without departing from the spirit and scope of the disclosed subject matter.

The functionality described in this disclosure may be implemented in whole or in part as a standalone approach, e.g., a software-based function executed by a hardware processor, or it may be available as a managed service (including as a web service via a SOAP/XML interface). The particular hardware and software implementation details described herein are merely for illustrative purposes are not meant to limit the scope of the described subject matter.

More generally, computing devices within the context of the disclosed subject matter are each a data processing system (such as shown in FIG. 8) comprising hardware and software, and these entities communicate with one another over a network, such as the Internet, an intranet, an extranet, a private network, or any other communications medium or link.

The scheme described herein may be implemented in or in conjunction with various server-side architectures including simple n-tier architectures, web portals, federated systems, and the like. The techniques herein may be practiced in a loosely-coupled server (including a "cloud"-based) environment.

Still more generally, the subject matter described herein can take the form of an entirely hardware embodiment, an entirely software embodiment or an embodiment containing both hardware and software elements. In a preferred embodiment, the function is implemented in software, which includes but is not limited to firmware, resident software, microcode, and the like. Furthermore, as noted above, the identity context-based access control functionality can take the form of a computer program product accessible from a computer-usable or computer-readable medium providing program code for use by or in connection with a computer or any instruction execution system. For the purposes of this description, a computer-usable or computer readable medium can be any apparatus that can contain or store the program for use by or in connection with the instruction execution system, apparatus, or device. The medium can be an electronic, magnetic, optical, electromagnetic, infrared, or a semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk—read/write (CD-R/W) and DVD. The computer-readable medium is a tangible item.

In a representative embodiment, the techniques described herein are implemented in a special purpose computer, preferably in software executed by one or more processors. The software is maintained in one or more data stores or memories associated with the one or more processors, and the software may be implemented as one or more computer programs. Collectively, this special-purpose hardware and software comprises the functionality described above.

While the above describes a particular order of operations performed by certain embodiments, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

Finally, while given components of the system have been described separately, one of ordinary skill will appreciate that some of the functions may be combined or shared in given instructions, program sequences, code portions, execution threads, and the like.

The techniques herein provide for improvements to another technology or technical field, e.g., deep learning systems, real-world applications of deep learning models including, without limitation, medical classifications, other security systems, as well as improvements to deployed systems that use deep learning models to facilitate command and control operations with respect to those deployed systems.

As previously mentioned, the technique herein may be used in any domain and with any application provided the data in question has multiple modalities. Thus, other example applications include, without limitation, image recognition using image features and text (from tags or captions), a video analysis using audio, text and images, even two non-identical text modalities, and so forth.

As used herein, a modality refers to a particular mode in which given information exists or is expressed. Within the context of the technique described herein, the only constraint is that there is some information that exists in at least first and second modalities such that at least one modality other than the first one is used to facilitate the feature consistency check. When there are more than two modalities, there may also be additional feature consistency checks, as well as feature consistency checking with respect to multiple ones of the other modalities.

The techniques described herein are not limited for use with any particular type of deep learning model. The approach may be extended to any machine learning model including, without limitation, a Support Vector Machine (SVM), a logistical regression (LR) model, and the like, that has internal processing states (namely, hidden weights), and the approach may also be extended to use with decision tree-based models.

Having described the subject matter, what we claim is as follows.

The invention claimed is:

1. A method to protect a machine learning model from misclassification by adversarial attack, wherein the machine learning model is associated with a dataset having some duplicate information specified in at least first and second modalities that differ from one another, wherein a modality is a particular mode in which the duplicate information is expressed, comprising:
   obtaining a first model and a second model, wherein the first model is specific to the first modality and the second model is specific to the second modality;
   training a consistency checking model based on the first and second models;
   receiving an input sample associated with data of the first and second modalities; and
   rejecting the input sample when a consistency level between the first and second modalities has a given relationship to a threshold associated with the consistency checking model.

2. The method as described in claim 1 wherein training the consistency checking model comprises:
   extracting a feature set from each of the first and second models;
   projecting the feature set extracted from each model into a common feature space; and
   using differences between the features sets to train the consistency checking model.

3. The method as described in claim 1 wherein the input sample is rejected when the consistency level between the first and second modalities is greater than the threshold.

4. The method as described in claim 2 wherein the feature set of each model is derived from outputs of a given fully-connected layer before logits layer for the respective model.

5. The method as described in claim 2 wherein the common feature space is associated with a projection model, wherein the projection model has an objective function that constrains a feature consistency check.

6. The method as described in claim 1 wherein, as compared to the second modality, the first modality has a higher risk of compromise by adversarial attack.

7. The method as described in claim 1 further including performing a classification using the machine learning model without the input sample.

8. An apparatus, comprising:
a processor;
computer memory holding computer program instructions executed by the processor to protect a machine learning model from misclassification by adversarial attack, the machine learning model being associated with a dataset having some duplicate information specified in at least first and second modalities that differ from one another, wherein a modality is a particular mode in which the duplicate information is expressed, the computer program instructions configured to:
obtain a first model and a second model, wherein the first model is specific to the first modality and the second model is specific to the second modality;
train a consistency checking model based on the first and second models;
receive an input sample associated with data of the first and second modalities; and
reject the input sample when a consistency level between the first and second modalities has a given relationship to a threshold associated with the consistency checking model.

9. The apparatus as described in claim 8 wherein the computer program instructions configured to train the consistency checking model comprise computer program instructions further configured to:
extract a feature set from each of the first and second models;
project the feature set extracted from each model into a common feature space; and
use differences between the features sets to train the consistency checking model.

10. The apparatus as described in claim 8 wherein the input sample is rejected when the consistency level between the first and second modalities is greater than a threshold.

11. The apparatus as described in claim 9 wherein the feature set of each model is derived from outputs of a given fully-connected layer before logits layer for the respective model.

12. The apparatus as described in claim 9 wherein the common feature space is associated with a projection model, wherein the projection model has an objective function that constrains a feature consistency check.

13. The apparatus as described in claim 8 wherein, as compared to the second modality, the first modality has a higher risk of compromise by adversarial attack.

14. The apparatus as described in claim 13 wherein the computer program instructions are further configured to perform erforming a classification using the machine learning model without the input sample.

15. A computer program product in a non-transitory computer readable medium for use in a data processing system to protect a machine learning model from misclassification by adversarial attack, the machine learning model being associated with a dataset having some duplicate information specified in at least first and second modalities that differ from one another, wherein a modality is a particular mode in which the duplicate information is expressed, the computer program product holding computer program instructions that, when executed by the data processing system, are configured to:
obtain a first model and a second model, wherein the first model is specific to the first modality and the second model is specific to the second modality;
train a consistency checking model based on the first and second models;
receive an input sample associated with data of the first and second modalities; and
reject the input sample when a consistency level between the first and second modalities has a given relationship to a threshold associated with the consistency checking model.

16. The computer program product as described in claim 15 wherein the computer program instructions configured to train the consistency checking model comprise computer program instructions further configured to:
extract a feature set from each of the first and second models;
project the feature set extracted from each model into a common feature space; and
use differences between the features sets to train the consistency checking model.

17. The computer program product as described in claim 16 wherein the input sample is rejected when the consistency level between the first and second modalities is greater than a threshold.

18. The computer program product as described in claim 16 wherein the feature set of each model is derived from outputs of a given fully-connected layer before logits layer for the respective model.

19. The computer program product as described in claim 16 wherein the common feature space is associated with a projection model, wherein the projection model has an objective function that constrains a feature consistency check.

20. The computer program product as described in claim 15 wherein, as compared to the second modality, the first modality has a higher risk of compromise by adversarial attack.

21. The computer program product as described in claim 20 wherein the computer program instructions are further configured to perform a classification using the machine learning model without the input sample.

* * * * *